(No Model.)
D. KLUMP.
CAN SOLDERING MACHINE.
No. 247,926. Patented Oct. 4, 1881.
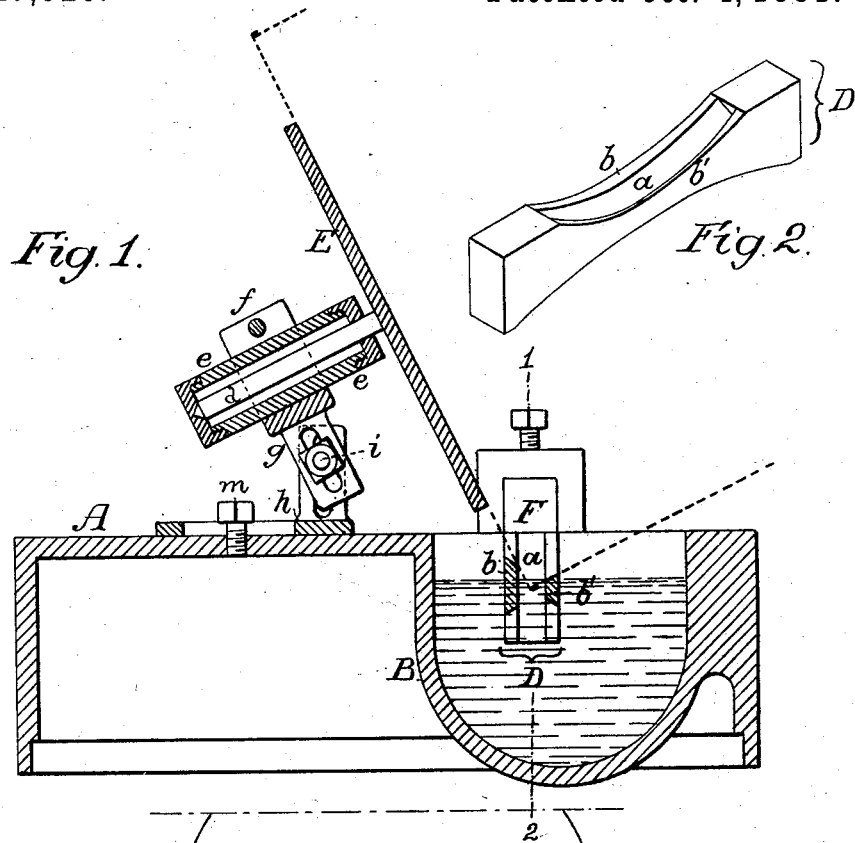
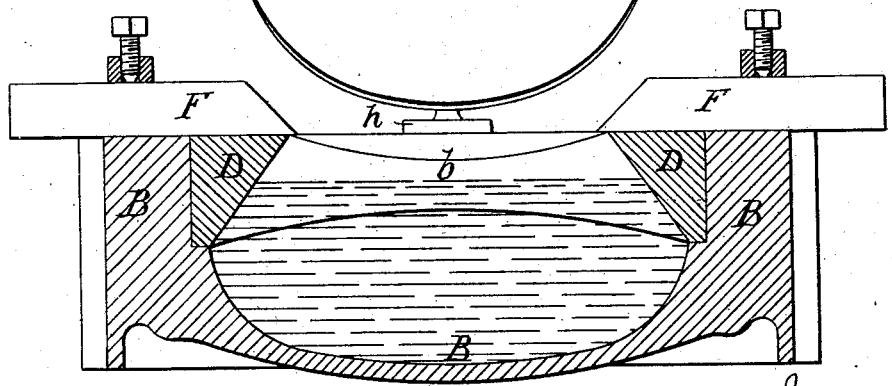
Witnesses: Henry L. Fulenwider, Harry Smith
Inventor: David Klump by his Attorneys Howson & Sons

UNITED STATES PATENT OFFICE.

DAVID KLUMP, OF MOORESTOWN, NEW JERSEY.

CAN-SOLDERING MACHINE.

SPECIFICATION forming part of Letters Patent No. 247,926, dated October 4, 1881.

Application filed July 29, 1881. (No model.)

*To all whom it may concern:*

Be it known that I, DAVID KLUMP, a citizen of the United States, residing in Moorestown, Burlington county, New Jersey, have invented certain Improvements in Can-Soldering Machines, of which the following is a specification.

My invention relates to an improvement in that class of can-soldering machines in which the seam of the can is rotated while submerged in the molten solder, the objects of my invention being to prevent the access of solder to the side or top of the can, except at the seam, and to provide an efficient and readily-adjustable support for the can while the same is being rotated.

In the accompanying drawings, Figure 1 is a longitudinal section of sufficient of a can-soldering machine to illustrate my invention; Fig. 2, a perspective view of part of same; and Fig. 3, a transverse section on the line 1 2, Fig. 1.

A is a flanged plate, which, in the complete machine, is supported upon suitable legs, so as to permit the insertion of a gas-burner or equivalent heating apparatus beneath the solder-pot B, which is cast with the plate A, the solder being constantly kept in a molten state in the pot by the heat applied to the latter.

To suitable slots in the opposite sides of the solder-pot are adapted the opposite ends of a bar, D, which has a central recess, $a$, extending through it, the portions $b\ b'$ of the bar on each side of this recess projecting above the level of the molten solder, as shown in Fig. 1. An inclosed trough or channel, bounded by the portions $b\ b'$ of the bar D, is thus formed, and that portion of the can which is submerged in the solder is contained within this inclosed channel, so that as the can is rotated the solder has access to the seam only, the portions $b\ b'$ of the bar preventing the solder from splashing or flowing up onto the side or end of the can, and thus insuring a neat seam. As the can is rotated, it is supported partly upon the portion $b'$ of the bar D and partly by a plate, E, against which the end of the can is pressed. The spindle $d$ of this plate is free to turn in bearings in a tube, $e$, which is carried by a clamp, $f$, a stem, $g$, on the latter being slotted for the reception of a bolt, $i$, which is also adapted to a slot in the vertical portion of a bent plate, $h$, the horizontal portion of the latter being secured to the plate A by a bolt, $m$, which passes through a slot in said plate $h$. By this means the tube carrying the spindle of the plate E can be adjusted either longitudinally or vertically, or can be vibrated on the bolt $i$ as a center, so as to vary the angle of the plate E as desired. As the can is rotated the surplus solder is removed from the outside of the seam by scraping-blades F, which are adapted to yokes on the plate A, and are adjustable laterally therein to accommodate cans of different sizes, being secured in position by set-screws after adjustment.

The upper edge of the portion $b'$ of the bar D should have a segmental recess formed therein for the reception of the can, and in order to adapt one bar, D, for the reception of cans of different diameters, I make the said bar D reversible, and recess both edges of the portion $b'$ of the bar, the segment of one edge being of greater radius than that of the other.

The portions $b$ of the bar need not be recessed, but may be straight at top and bottom, if desired, and in some cases two independent bars, $b\ b'$, may be used instead of a single bar, D, recessed as described.

I claim as my invention—

1. The combination of the solder-pot of a can-soldering apparatus with a reversible slotted bar, D, adapted to slots in the opposite sides of the pot, as and for the purpose set forth.

2. The combination of the solder-pot with the reversible bar D, slotted to form an inclosed channel or trough, bounded by the portions $b\ b'$ of the bar, and the portion $b'$ having opposite edges of different radii, as set forth.

3. The combination of the solder-pot with the slotted can-supporting bar and adjustable scraping-blades F at the ends of said bar.

4. The combination of the solder-pot with the plate E, having a spindle, $d$, the tube $e$, the clamp with slotted stem, slotted plate $h$, and bolt $i$, all substantially as described.

In testimony whereof I have signed my name to this specification in the presence of two subscribing witnesses.

DAVID KLUMP.

Witnesses:
WM. J. MORRISON,
ELWOOD WATSON.